Jan. 17, 1956

H. DREYER 2,731,144

EXTRUSION TOOL ASSEMBLY FOR LIGHT
METAL CABLE SHEATHING PRESSES

Filed June 4, 1951

INVENTOR.
HANS DREYER

BY
Pollard and Johnston

ATTORNEYS

United States Patent Office 2,731,144
Patented Jan. 17, 1956

2,731,144

EXTRUSION TOOL ASSEMBLY FOR LIGHT METAL CABLE SHEATHING PRESSES

Hans Dreyer, Dusseldorf, Germany, assignor to The Loewy Engineering Company Limited, London, England, a corporation of Great Britain Application June 4, 1951, Serial No. 229,754

Claims priority, application Great Britain July 26, 1950

2 Claims. (Cl. 207—4)

This invention relates to extrusion presses for light metal cable sheathings, such as are described and claimed in my co-pending application No. 229,755. In these presses, the cables to be sheathed traverse the bore of the container of the press along a diameter of the container bore; the mandrel and the die through which the cables pass are therefore arranged in two crossbores of the container which are axially aligned with each other, both mandrel and die being of substantially tubular shape. The bore of the container is of uniform diameter throughout and either permanently open at one end and temporarily closed at the other or permanently open at both ends.

The press is preferably operated in such a way that a number of billets are introduced into the open end or ends of the container bore and extruded therefrom in succession, each billet being only partly extruded and its unextruded portion left in the container bore, so that it can weld itself to the next billet introduced into the container bore, whereby a continuous sheathing is formed around the cable.

The present invention relates more specifically to the arrangement of mandrel and die in their respective crossbores and to the means for holding them in position therein.

It is essential in the press to which this invention relates that both mandrel and die are firmly held in position as any deviation therefrom, however small, would alter the width of the extrusion gap formed between the ends of the mandrel and die, which face each other. This would alter the thickness of the extruded sheathing, which is, of course, not permissible. On the other hand, it is desirable that mandrel and die should be capable of fine and accurate axial adjustment in their respective crossbores, for the purpose of varying the width of the extrusion gap at will, and thereby also the thickness of the sheathing. Finally, mandrel and die should be so mounted that they can be readily removed from the container whenever they have to be exchanged for another set.

It is an object of the invention to provide an extrusion tool assembly consisting of mandrel and die and their associated parts, such as holders, which fulfils the above requirements.

In one aspect of the invention, the mandrel and the die are each inserted into a crossbore in the container together with a separate element which serves as a back-stop for the mandrel or die respectively, whereby they are held against outward displacement whilst inward displacement of mandrel and die is prevented by the metal inside the container bore which exerts an endwise directed pressure on mandrel and die during an extrusion operation, and thus causes mandrel and die to make firm contact with their respective back-stops.

These and other features and advantages of the invention will become more apparent from the drawings which will now be described more in detail and which show one embodiment of the invention.

Figure 1:
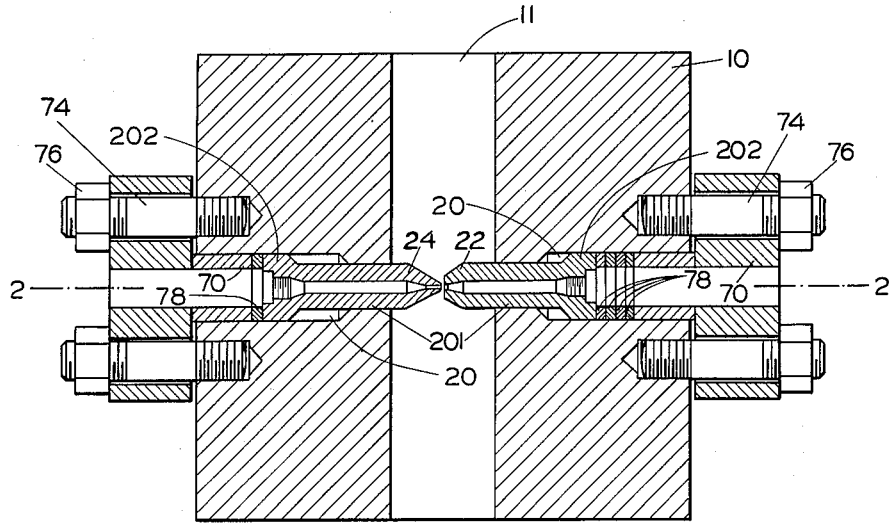
Fig. 1 is a horizontal section through the container of an extrusion press according to the invention, showing the mandrel and die and their associated parts in position in their respective crossbores, the section being taken along line 1—1 of Fig. 2.
Figure 2:
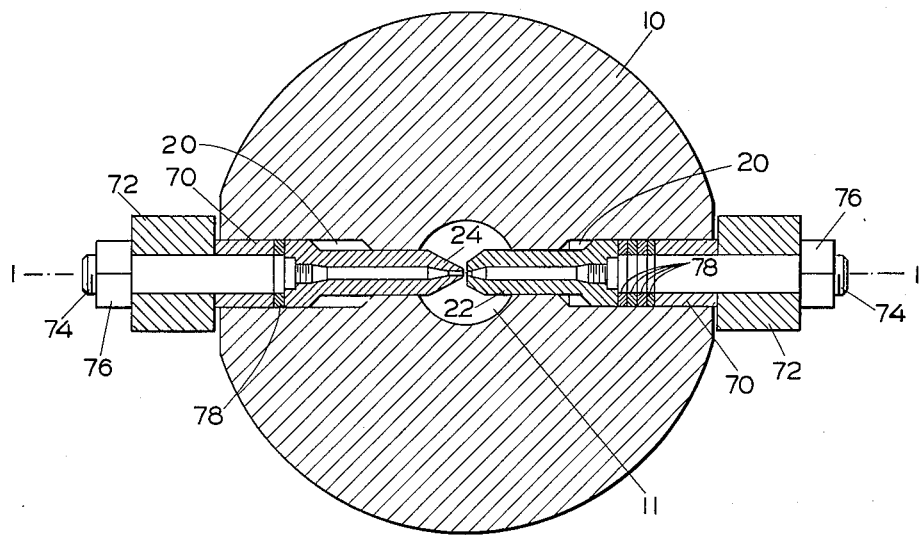
Fig. 2 is a section along line 2—2 of Fig. 1.

In the figures, the container 10 of an extrusion press for light metal cable sheathings similar to that described and claimed in my co-pending application No. 229,755 is shown having a bore 11 which is open at both ends and of uniform diameter from end to end, so that the container can be charged with solid metal billets from either end. The invention can, however, be equally applied to containers which are open at one end only and closed at the other. The space in the container bore which is taken up by a billet after it has been introduced therein will be referred to in the following as "the billet chamber," while the remaining space of the container will be referred to as "the extrusion chamber."

The container has two crossbores 20 axially aligned with each other into which a mandrel 22 and a die 24, both of tubular shape, are so inserted that their inner ends protrude into the extrusion chamber. The gap between the ends of the mandrel and die which face each other and through which the billet metal is extruded into the die and around the cable so as to form a sheathing, will be referred to in the following as "the extrusion gap."

During the operation of the press, billets are charged into the container bore 11 and extruded therefrom by means of hydraulically-operated pressing stems, not shown here, which are displaceable both in the billet and extrusion chambers of the container bore, whereby the billet metal is forced from the extrusion chamber through the extrusion gap into the die 24. In carrying out this process, strong forces are exerted on the protruding ends of the mandrel and die in an endwise direction which tend to move the mandrel and die away from each other, whereby the width of the extrusion gap would be altered. This is, however, not permissible as the wall thickness of the extruded sheathing is determined by the width of the gap, so that any unintentional alteration of that width, however small, would result in a faulty sheathing. It is, therefore, essential that mandrel and die are firmly held in their pre-set positions in their respective crossbores during an extrusion operation.

To this end, back-stops 70 in the form of sleeves of the same diameter as the mandrel 22 and die 24 are inserted in the outer ends of the crossbores 20. The sleeves have outwardly projecting ends carrying crossheads 72. The latter are of substantial height, inasmuch as they have to have a cross-section sufficiently large to take up the considerable forces exerted by the extruded metal on the mandrel 22 and the die 24. The crossheads 72 are attached to the container by means of heavy screw bolts 74 which are threaded into the container 10 and pass freely through holes in crossheads 72. Outward movement of the sleeves 70 is prevented by nuts 76 formed or threaded on the bolts 74.

In the example shown distance rings 78 are inserted between the mandrel 22 and die 24 and their respective sleeves 70. By varying the number of the distance pieces or by exchanging them for distance pieces of different height, the protrusion of mandrel 22 and die 24 into the extrusion chamber of the container bore 11 can be varied if desired and the width of the extrusion gap adjusted thereby.

The mandrel 22 and die 24 are thus held permanently against outward axial displacement in their respective crossbores 20 by separate back-stops 70, whilst no such back-stops are provided for preventing inward movement of mandrel and die. This movement is prevented by the metal inside the extrusion chamber of the container bore which exerts an endwise directed pressure on mandrel 22 and die 24 during the extrusion operations and causes them to make firm contact with their respective back-stops 70. There is, therefore, no need to provide means such as screw-threads for fastening the mandrel and die or their holders to the crossbores 20 of the container, and it is possible to give mandrel and die the outside shape of plain tubular bodies, whereby their manufacture is simplified and their insertion into and removal from the container greatly facilitated. At the same time, it is ensured that mandrel and die are firmly held in their pre-set axial positions during the extrusion operations and that the width of the extrusion gap remains unchanged.

In the example shown, mandrel 22 and die 24 have rearward extensions of somewhat greater inner and outer diameter than their front parts, so that cooling means, not shown here, can be arranged therein.

Both mandrel 22 and die 24 are radially supported in their respective crossbores 20 by two separate bearing surfaces 201 and 202 respectively which are spaced apart from each other, whereby the guiding and centering of mandrel and die are facilitated.

It is to be understood that variations may be made in details of construction whilst retaining the essential features of the invention.

What is claimed is:

1. In an extrusion press for cable sheathing, said press having a billet container with a bore of uniform diameter from end to end for the extrusion of solid billets therefrom and axially aligned, smooth-walled crossbores, said crossbores each having spaced cylindrical bearing sections of different diameters, the bearing section nearest the billet container bore being of smaller diameter than the bearing section remote from the container bore, two oppositely arranged cooperating tubular extrusion tool assemblies consisting of a tubular mandrel and a die in said crossbores each having smooth wall sections of different diameter fitting the corresponding bearing surfaces of said crossbores, said mandrel and die being freely and slidably mounted in said crossbores so that they are free to move towards each other when the container bore is not filled with billet metal, the forward ends of said mandrel and die protruding into said container bore, a backstop for each tool having a sliding fit in the outer end of its adjacent crossbore and adapted to restrain outward movement of said tool, a cross-member for each of said backstops, said cross-member being arranged outside said container and extending across and beyond the outer circumference of said crossbores, tension elements connecting said cross-members and said container, said tension elements being laterally spaced apart from said crossbores and adapted to resist outwardly-directed pressure on said tools and said backstops, and distance pieces insertable in said tool assemblies for adjusting the protrusion of said tools into the container bore.

2. In an extrusion press for cable sheathing, said press having a billet container with a bore of uniform diameter from end to end for the extrusion of solid billets therefrom and axially aligned, smooth-walled crossbores, said crossbores each having spaced cylindrical bearing sections of different diameters, the bearing section nearest the billet container bore being of smaller diameter than the bearing section remote from the container bore, two oppositely arranged cooperating tubular extrusion tools consisting of a tubular mandrel and a die in said crossbores each having smooth wall sections of different diameter fitting the corresponding bearing surfaces of said crossbores, said mandrel and die being freely and slidably mounted in said crossbores so that they are free to move towards each other when the container bore is not filled with billet metal, the forward ends of said mandrel and die protruding into said container bore, a backstop for each tool having a sliding fit in the outer end of its adjacent crossbore and adapted to restrain outward movement of said tool, a cross-member for each of said backstops, said cross-member being arranged outside said container and extending across and beyond the outer circumference of said crossbores, tension elements connecting said cross-members and said container, said tension elements being laterally spaced apart from said crossbores and adapted to resist outwardly-directed pressure on said tools and said back-stops.

References Cited in the file of this patent

UNITED STATES PATENTS

| | | |
|---|---|---|
| 346,563 | Robertson | Aug. 3, 1886 |
| 515,951 | Cobb | Mar. 6, 1894 |
| 1,011,522 | Summey | Dec. 12, 1911 |
| 1,011,876 | Summey | Dec. 12, 1911 |
| 2,002,690 | Carter | May 28, 1935 |